United States Patent
Padmanabhan et al.

(10) Patent No.: US 12,001,871 B2
(45) Date of Patent: Jun. 4, 2024

(54) VIRTUAL MACHINE PROVISIONING AND DIRECTORY SERVICE MANAGEMENT

(71) Applicant: Microsoft Technology Licensing, LLC, Redmond, WA (US)

(72) Inventors: Prasanna Chromepet Padmanabhan, Redmond, WA (US); Somesh Goel, Newcastle, WA (US); Jun Shi, Redmond, WA (US); Scott Alan Manchester, Moses Lake, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 415 days.

(21) Appl. No.: 17/356,050

(22) Filed: Jun. 23, 2021

(65) Prior Publication Data

US 2022/0413885 A1 Dec. 29, 2022

(51) Int. Cl.
*G06F 9/455* (2018.01)
*H04L 67/141* (2022.01)
*H04L 67/10* (2022.01)

(52) U.S. Cl.
CPC ........ *G06F 9/45558* (2013.01); *H04L 67/141* (2013.01); *G06F 2009/45595* (2013.01); *H04L 67/10* (2013.01)

(58) Field of Classification Search
CPC ....... G06F 9/45558; G06F 2009/45595; H04L 67/141; H04L 67/10
See application file for complete search history.

(56) References Cited

U.S. PATENT DOCUMENTS

| 2014/0019960 A1 | 1/2014 | Jacklin et al. |
| 2017/0149780 A1 | 5/2017 | Tellvik et al. |
| 2017/0329698 A1 | 11/2017 | Watt et al. |

OTHER PUBLICATIONS

"Microsoft / HighSecurityAPIM", Retrieved from: https://github.com/Microsoft/HighSecurityAPIM, May 15, 2019, 23 Pages.
Brown, et al., "Deploy Azure Databricks in your Azure virtual network (VNet injection)", Retrieved from: https://docs.microsoft.com/en-us/azure/databricks/administration-guide/cloud-configurations/azure/vnet-inject, May 13, 2021, 12 Pages.
Brown, "Upgrade your VNet Injection preview workspace to GA", Retrieved from: https://docs.microsoft.com/en-us/azure/databricks/administration-guide/cloud-configurations/azure/vnet-inject-upgrade, Mar. 17, 2021, 8 Pages.

(Continued)

*Primary Examiner* — Gregory A Kessler
(74) *Attorney, Agent, or Firm* — Schwegman Lundberg & Woessner, P.A.

(57) ABSTRACT

A computer implemented method includes granting a subscriber client access to a cloud service-based resource group within a subscriber controlled computing environment. The subscriber controlled computing environment has a virtual network. A direct network connection is established via the virtual network to a domain controller in the subscriber controlled computing environment. The virtual network is extended to a subscriber client virtual machine in a producer cloud service. The subscriber client virtual machine is then joined with the virtual network. Access to the subscriber client virtual machine is provided via the subscriber controlled computing environment and virtual network.

20 Claims, 5 Drawing Sheets

(56) References Cited

OTHER PUBLICATIONS

Dwivedi, et al., "What is Azure Virtual Network?", Retrieved from: https://docs.microsoft.com/en-us/azure/virtual-network/virtual-networks-overview, Dec. 3, 2020, 5 Pages.
Hassan, et al., "Deploy dedicated Azure services into virtual networks", Retrieved from: https://docs.microsoft.com/en-us/azure/virtual-network/virtual-network-for-azure-services, Apr. 6, 2020, 4 Pages.
Pawlikowski, Michał, "Azure Databricks deployment and error: SubnetMissingRequiredDelegation—VNet injection problem", Retrieved from: http://sql.pawlikowski.pro/2019/10/15/azure-databricks-deployment-and-error-Subnetmissingrequireddelegation-vnet-, injection/#:~:text=What%20is%20VNet%20injection%3F%20VNet%20injection%20in%20databricks,which%20is%20always%20automatically%20created%20behind%20the%20scenes., Oct. 15, 2019, 6 Pages.
Saba, et al., "Deploy Azure Data Explorer cluster into your Virtual Network", Retrieved from: https://docs.microsoft.com/en-us/azure/data-explorer/vnet-deployment, Oct. 31, 2019, 13 Pages.
"International Search Report and Written Opinion Issued in PCT Application No. PCT/US22/030448", dated Sep. 8, 2022, 11 Pages.

VIRTUAL MACHINE PROVISIONING AND DIRECTORY SERVICE MANAGEMENT

BACKGROUND

In cloud-based computing environments, cloud-based computer services may be provided to a subscriber alongside their own computing infrastructure. Services are managed in a cloud environment with a cloud-based directory service managing storage of information and access rights to users of the subscriber. Many users of the subscriber utilize personal computers and other smart devices to access the cloud environment. The users provide credentials to obtain such access which is authorized by the directory service.

Setting up or provisioning virtual computers for users can be a time-consuming endeavor, with system administrators having to manually create and distribute provisioning packages, which may not be secure. An end user still needs to perform interactive actions before the virtual computer is ready for use.

SUMMARY

A computer implemented method includes granting a subscriber client access to a cloud service-based resource group within a subscriber controlled computing environment. The subscriber controlled computing environment has a virtual network. A direct network connection is established via the virtual network to a domain controller in the subscriber controlled computing environment. The virtual network is extended to a subscriber client virtual machine in a producer cloud service. The subscriber client virtual machine is then joined with the virtual network. Access to the subscriber client virtual machine is provided via the subscriber controlled computing environment and virtual network.

DETAILED DESCRIPTION

Figure 1:
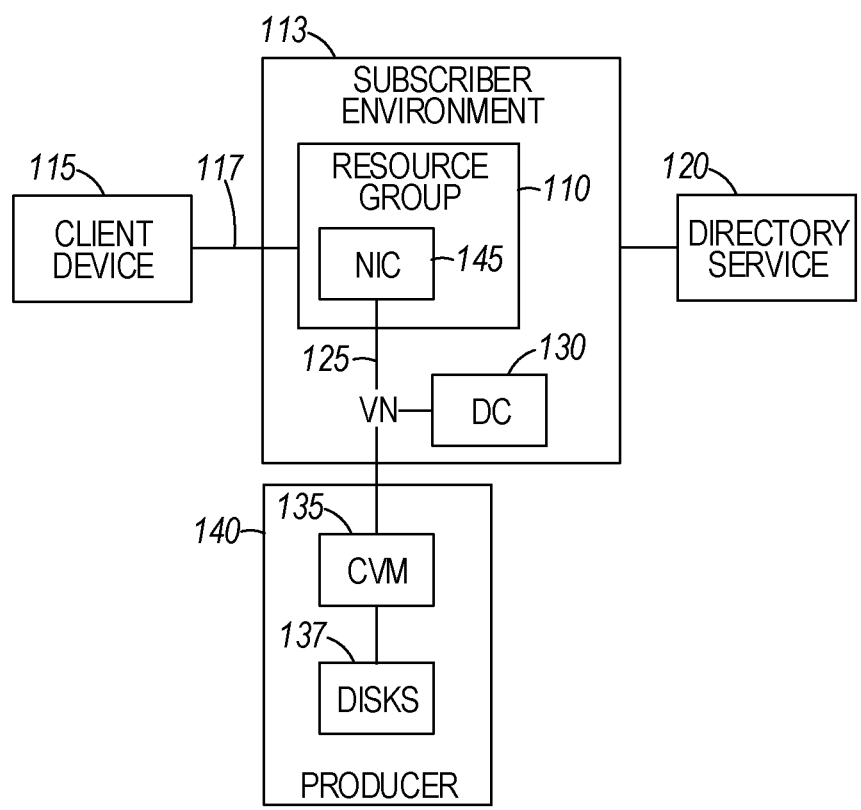
FIG. 1 is a block diagram of a system for providing a cloud service in a subscriber environment in a subscriber environment domain to one or more subscriber clients according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Some enterprises utilize a cloud-based information technology infrastructure along with their own domain controller for providing computing services to users. The enterprise, referred to as a subscriber, may have a first license with a cloud-based service provider to create a subscriber resource group with a virtual network. Provisioning of virtual computers for use by subscriber clients of the subscriber can involve a manual process for each subscriber client. The virtual computers may be provided under a second license and may be provided by a different cloud service. Each such virtual computer is manually set up by an administrator in a time and effort intensive manner. Such a set up typically involves logging into a current virtual machine, then registering with a directory service, then registering with the tenant, and then obtaining a configuration package.

The present inventive subject matter provides a subscriber client access to a cloud service-based resource group within a subscriber controlled computing environment having a virtual network. A line of sight connection to a domain controller in the subscriber controlled computing environment is established via the virtual network. The domain controller is joined to a cloud-based directory service. The virtual network is extended to a subscriber client virtual machine in a producer cloud service provided producer environment. The subscriber client virtual machine is then joined to the virtual network. The virtual network provides subscriber client access to the subscriber client virtual machine via the subscriber controlled computing environment.

A first token may be used to create the subscriber client virtual machines in the producer environment. A second token is then used to link the subscriber client virtual machines to the virtual network. A network interface card is injected into the cloud service-based resource group for each subscriber client virtual machine. Each subscriber client will access their corresponding subscriber client virtual machine using only identity information via the network interface card through the virtual network without having to open an inbound port on the subscriber client virtual machine.

By joining the subscriber client virtual machines to the virtual network, the subscriber client virtual machines may be managed as a service offering, allowing subscribers to utilize any desired endpoint management service. By using the network interface card in combination with the joined virtual network, a more secure connection to the subscriber client virtual machines may be obtained.

Subscribers may simply identify a number of subscriber clients and specified virtual machines in order to cause the subscriber client virtual machines to be provisioned and linked such as by joining to the virtual network for use by the corresponding subscriber clients, saving significant effort in allocating and managing the provisioning of virtual machines.

In one example, a test virtual machine may be used to verify the subscriber computing environment is capable of interfacing with the subscriber client virtual machines. The test virtual machine may continue to periodically check the capability of the subscriber computing environment by ensuring the virtual network has sufficient IP addresses and that permissions are granted and stay granted. Further checks may be made to ensure the join can occur, ensure domain name server resolution works in the subscriber computing environment, ensure domain join token or credential provided is correct such that subsequently provisioned subscriber client virtual machines can be joined, and to ensure that services for managing the subscriber client virtual machines are reachable via the subscriber computing environment. All these checks can provide early warning and help prevent potential downtime.

FIG. 1 is a block diagram of a system 100 for providing a cloud service 110 in a subscriber environment 113 in a subscriber environment domain to one or more subscriber clients 115. Subscriber clients 115 may be machines and may also represent users of a subscriber enterprise referred to as a subscriber. The cloud service 110 may be a resource group that is a container for multiple resources. The multiple resources may provide a solution to the subscriber of a cloud service subscription for the subscriber environment 113. The cloud service subscription provides access to multiple services provided by the cloud service 110.

Access by subscriber clients 115 to the cloud service 110 may be obtained using a subscriber client token, such as a user identifier and a password, provided via a gateway such as a Microsoft Windows Virtual Desktop control plane 117 from Microsoft Corporation of Redmond, Washington, United States. Access may be authorized by a directory service 120 included in the cloud service subscription. Directory service 120 may be in a different domain and provides access control to services and stored data. One example of directory service 120 is Azure Active Directory (AAD) from Microsoft Corporation.

In one example, subscriber client 115 may have an associated administrator of the subscriber that is responsible for helping set up other subscriber clients with access to the cloud service 110, such as Azure cloud services. The administrator may add a virtual network 125 to the subscriber environment 113. The virtual network 125 may connect via a line of sight, or direct network connection to a domain controller 130, which may be a subscriber device, making the system 100 a hybrid system having both cloud resources and resources under direct control by the subscriber. The line of sight connection allows direct communication via the direct network connection with the domain controller 130 as if it is in the same domain as the cloud service 110 without the domain controller 130 being exposed on a publicly accessible endpoint. A direct network connection allows the domain controller to be addressed by its IP address or hostname (DNS name).

A domain controller generally is a server computer that responds to security authentication requests within a computer network domain. It is a network server that is responsible for allowing host access to domain resources. It authenticates users, stores user account information and enforces security policy for a domain. Domain controller 130 may utilize the directory service 120 for performing security authentication.

In one example, the subscriber may desire to obtain a subscription for virtual machines for use by subscriber clients. The subscriber may use a cloud service subscription from a producer 140 and provide a virtual machine image for use in provisioning virtual machines. A client virtual machine (CVM) 135 along with disk or storage 137 is shown in a producer environment 140 in a producer domain. The virtual network 125 is extended to the producer environment 140 by injecting or provisioning a network interface card (NIC) 145 into the resource group 110 with a line of sight connection to the domain controller 130 via the virtual network 125.

One or more CVMs 135 may be provisioned via the producer environment 140 which may be a cloud-based service such as Microsoft Windows Virtual Desktop (WVD). WVD may provide multiple resources within the producer environment 140 such as application groups, a collection of virtual machines referred to as a hostpool, and a workspace that includes storage space. A golden virtual machine image may also be stored in an image gallery within the producer environment 140.

An NIC 145 is provisioned or injected into the resource group 110 for each subscriber client and corresponding subscriber client virtual machine 135 to provide a one to one correspondence between NICs 145 and CVMs 135. The CVMs 135 may be joined to the subscriber environment 113 domain. Once provisioned and domain joined, each CVM 135 may be synchronized to the directory service 120 which is part of the cloud service providing the domain 110.

Figure 2:
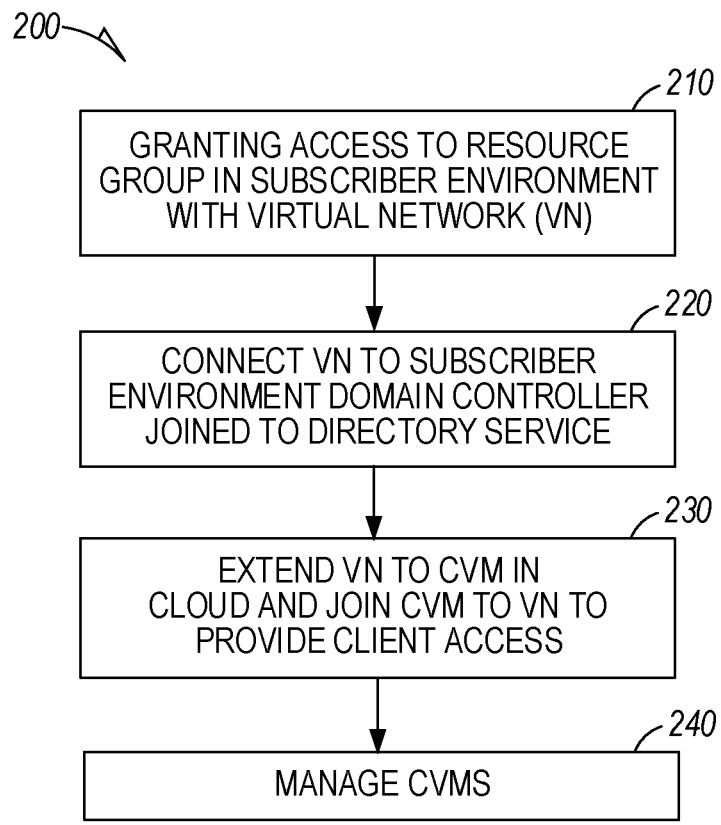
FIG. 2 is a flowchart of a method of providing client virtual machines to authorized clients according to an example embodiment.

FIG. 2 is a flowchart of a method 200 of providing CVMs to authorized subscriber clients in a secure and efficient manner. Method 200 begins at operation 210 by granting a subscriber client access to a cloud service-based resource group within a subscriber controlled computing environment having a virtual network. Granting access to the cloud service-based resource group may be done by receiving an administrator subscription token via a subscriber client device to access the subscriber controlled virtual environment.

A line of sight connection via the virtual network to a domain controller in the subscriber controlled computing environment is established at operation 220. The domain controller is joined to a cloud-based directory service. At operation 230, the virtual network is extended to a subscriber client virtual machine in a producer cloud service. The client virtual machine is then joined at operation 230 to the virtual network. Such joining provides access to the cloud personal computer virtual machine to the subscriber user via the subscriber controlled computing environment. Extending the virtual network to subscriber client virtual machine in the producer cloud service to provide access to the subscriber client virtual machine may be done using a virtual network linking token, different from the subscription token.

Joining the subscriber client virtual machine to the virtual network, and by extension to the domain controller also includes joining the subscriber client virtual machine to the directory service for providing directory service functions to the client virtual machine. Such a connection allows the administrator to manage the subscriber client virtual machine using the directory service. Each subscriber client virtual machine may also be enrolled in an endpoint management service and registered with a desktop remoting service.

Access to the cloud personal computer virtual machine is provided to the subscriber client via a dedicated network connection in the cloud service-based resource group. The dedicated network connection comprises a network interface card injected or provisioned in the resource group virtual network and is accessed via a subscriber client token. The network interface card may be a virtual network interface card Each subscriber CVM may be registered with a desktop remoting service, such as WVD. Once registered, multiple subscriber clients may be provided access to multiple respective subscriber CVMs via multiple respective unique network interface connections. Such access may be provided through a sequence referred to as reverse connect. Reverse connect establishes a remote desktop protocol (RDP) connection by way of the subscriber client and subscriber CVM by opening an inbound port on the CVM. The RDP connection allows the subscriber client to control their subscriber client virtual machine like a local machine such as a personal computer.

At operation 240, each of the subscriber CVMs may be managed via the producer cloud service in accordance with a provisioning policy provided via the subscriber controlled computing environment.

Figure 3:
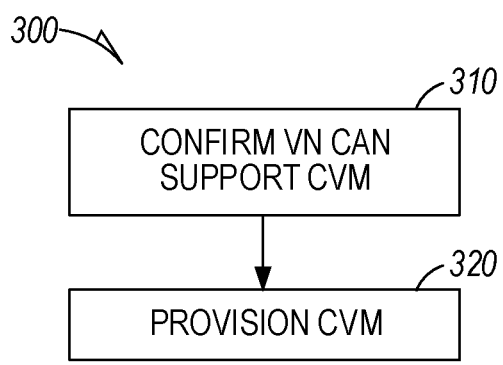
FIG. 3 is a flowchart of a computer implemented method of extending a virtual network to a subscriber client virtual machine according to an example embodiment.

FIG. 3 is a flowchart of a computer implemented method 300 of extending the virtual network to the subscriber CVM. Method 300 begins at operation 310 by controlling a test virtual machine, referred to as a canary machine, to confirm that the virtual network can support the subscriber CVM. In one example, the test virtual machine performs a domain join with the domain controller using a producer cloud service token to confirm that a domain join can be done for the subscriber CVMs. Test virtual machine may also check that connections are available to the virtual network. In a further example, the test virtual machine determines that a directory service join is available.

Figure 4:
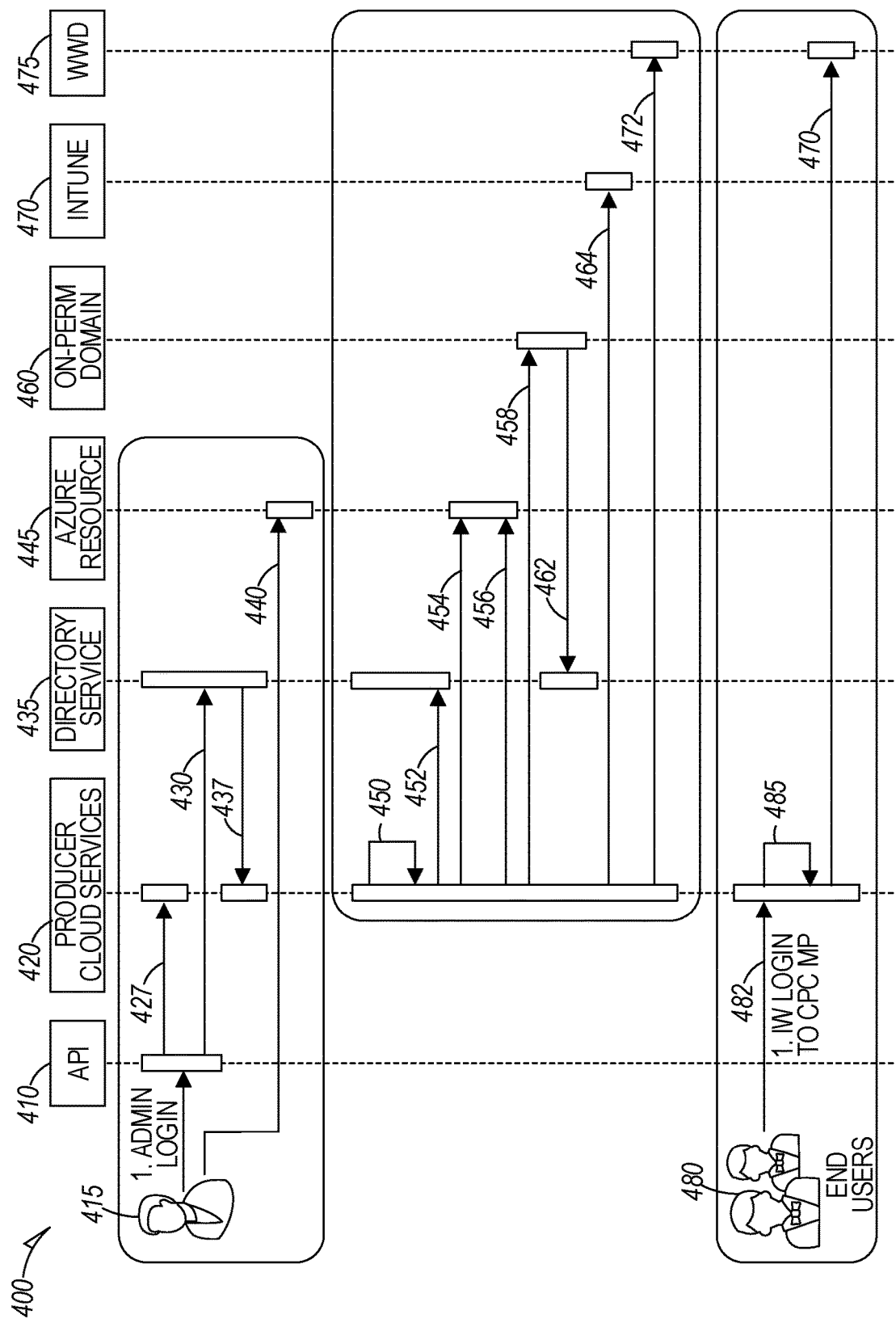
FIG. 4 is a sequence diagram illustrating data flow for creating, provisioning, and joining subscriber client virtual computers in a hybrid joined computing environment provided via a cloud services subscription according to an example embodiment.

FIG. 4 is a sequence diagram 400 illustrating data flow for creating, provisioning, and joining subscriber client virtual computers in a hybrid joined computing environment provided via a cloud services subscription. Diagram 400 also illustrates the ease of subscriber clients accessing their corresponding client virtual computers.

A top row in FIG. 4 illustrates devices or services that receive data that is flowing between the devices or services. Such devices perform functions as a result of receiving data for provisioning and linking CVMs for multiple subscriber clients. The elements of system 400 may be provided by a combination of cloud-based services and enterprise-based services or devices in one example. System 400 is suitable for enterprises, referred to as subscribers, that have existing information technology infrastructure that can be augmented or complemented by cloud-based services.

In one example with reference also made to FIG. 1 elements, system 400 includes an application programming interface, API 410 for providing an administrator 415 access into cloud hosted producer cloud services 420. The administrator 415, also representing an administrator device, provides an administrator token at 425 in the form of login credentials to the API 410, which are used at 427 to access producer cloud services 420 to initiate generation of subscriber CVMs. The API 410 also sends a request 430 to a directory service 435. The directory service 435 confirms that the subscriber has a license for virtual machines for one or more subscriber clients at 437 for later synchronizing licenses to subscriber clients. The administrator 415 may also send a request at 440 to a further cloud service 445 for configuring a virtual network in a subscriber environment in accordance with a subscription to a cloud service.

In response to the confirmation at 437, producer cloud services 420 may generate a test virtual machine, also indicated at 135, in the producer environment 140. The test virtual machine is used to perform auto validation at 450. Auto validation involves validating that the virtual network 125 has a domain controller 130. In addition, multiple checks on the subscriber controlled computing environment 113 may be performed. A check may also be made to determine that there are sufficient Internet Protocol (IP) addresses for each subscriber virtual machine 135 to be created and provisioned. The test virtual machine, also represented at 135, may be used periodically, in addition to the first time a subscriber client virtual machine 135 is to be created for a subscriber client 115, to ensure that the virtual network can be successfully extended from the subscriber controlled environment 113 to the virtual machine 135 domain of the test virtual machine.

In one example, the test virtual machine performs a domain join with the domain controller 130 using a producer cloud service first party app token to confirm that a domain join can be done for the subscriber client virtual machines. The test virtual machine may also check that connections are available. In a further example, the test virtual machine determines that a directory service join is available.

Following validation, producer cloud services 420 requests a first party app token at 452 from the director service 435. Producer cloud services 420 also requests the creation of a subscriber CVM 135 in the virtual machine producer environment 140 at 454, along with a request at 456 for injection of the virtual network into the subscriber CVM. Both requests are sent to the cloud service 445 that also provides the cloud service 110.

The request at 456 results in the injection of network interface card 145 by the cloud service 110 for the subscriber client 115 to use to access the subscriber client virtual machine. In one example, the network interface card 145 is a virtual card. One network interface card 145 will be injected for each subscriber client virtual machine and corresponding subscriber client.

A further request 458 is sent from the producer cloud services 420 to the subscriber controlled computing environment 460 domain, resulting in a request 462 back to the directory service 435 for connecting the domains via a join, using the requested first party app token generated in response to the request at 452. The first party app token is separate from the administrator token used to create the virtual machines in the producer environment. The producer environment is referred to as a hosted on behalf of (HOBO) environment.

The subscriber CVM 135 is now joined to the domain controller 130 in the subscriber controlled environment 113 using the first party app token. Multiple such CVMs 135 may be created and joined in the same manner for use by multiple respective subscriber clients 115. Enrollment of subscriber clients may be requested by the producer cloud services 420 via an enrollment request 464 to an application or service 470 for managing virtual machines, such as Microsoft Intune®. Any service that provides the ability to manage virtual machines according to management policies may be used.

Producer cloud services 420 may also send a request at 472 to a provisioning service 475 to provide access to provide desktop like capabilities on the subscriber CVM for the subscriber client, essentially creating a personal computer in the cloud. In one example, provisioning service 475 comprises Microsoft Windows Virtual Desktop service.

At this point, without any intervention or actions by a subscriber client 480, the subscriber CVM has been created, provisioned, and joined to the domain controller, as well as the directory service 435. Once each subscriber client virtual machine is created, provisioned, and joined, the subscriber client 480 may access the CVM simply by logging in. Logging in may include providing a subscriber client token at 482 via a portal to the producer cloud services 420. The producer cloud services 420 determines the subscriber CVM corresponding to the token and links the subscriber CVM to the network interface card at 485. The subscriber client will be directly connected at 490 to their subscriber CVM without having to perform any setup or provide any additional credentials in one example.

Figure 5:
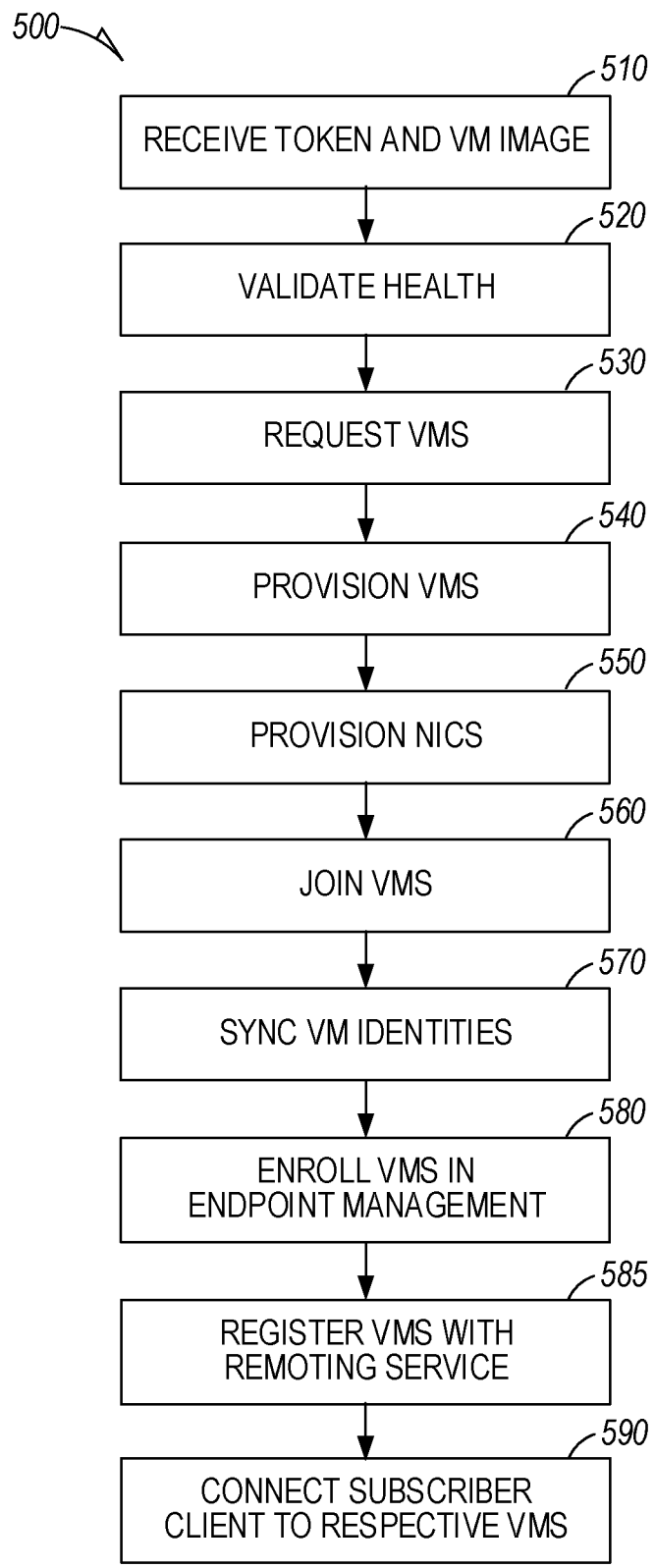
FIG. 5 is a flowchart illustrating an end to end method of provisioning virtual machines in hybrid environment according to an example embodiment.

FIG. 5 is a flowchart illustrating an end to end method 500 of provisioning virtual machines in a hybrid environment. In one example, virtual network (VNET) injection is used to provision virtual machines (VMs) associated with a virtual machine cloud service subscription. The VMs are then joined to an entity VNET provided by an entity cloud service subscription. A VM central processing unit (CPU) and disk may be in the virtual machine cloud service subscription while a network interface card (NIC) is "injected" into the entity cloud service subscription. All VMs may be joined to an entity directory service and managed by an endpoint management application. Such joining increases security of the VMs.

The virtual machine cloud service subscription may be provided by a Microsoft Cloud Personal Computer (PC) service that obtains hardware capacity in Microsoft Azure and keeps a ledger of CPU and storage capacity across various Azure regions. This capacity may be provided via group by Azure subscriptions.

Method 500 begins at operation 510 by receiving a VM image from a subscriber, the VNET (contained in an Azure subscription), and subscriber environment domain credentials in the form of a token for their directory service, such as AAD environment.

At operation 520, a virtual machine cloud service test VM validates the health of subscriber environment by domain joining the test VM. Once validated (the test VM performs one or more other checks), the subscriber requests the virtual machine cloud service to create a number of subscriber client virtual machines at operation 530, sometimes referred to as Cloud PCs.

The virtual machine cloud service provisions VMs at operation 540 using the capacity obtained in the Microsoft Azure subscription. Each provisioned VM's compute and storage is in the provider environment under a cloud service subscription, but its NIC is provisioned into the subscriber's VNET at operation 550. The provisioned VMs are then joined at operation 560 to the subscriber environment domain such as by a VM Extension script.

Once provisioned and domain joined, each VM's identity is synced at operation 570 to the directory service cloud identity. Each VM may then be enrolled at operation 580 in endpoint management services of the subscriber's choice. Each VM is then registered at 585 with a remote desktop service, such as WVD. After registration with WVD, subscriber clients are able to remotely access their subscriber CVM at operation 590 through a sequence called Reverse Connect. Reverse Connect establishes an RDP connection between subscriber client and subscriber CVM without opening inbound port on the subscriber CVM.

In one example, the sequence may utilize the following steps. The subscriber client connects to the remote desktop services to obtain an RDP file. The remote desktop service contacts a remote desktop broker to obtain launch parameters and constructs the RDP file. The subscriber client connects to a nearby gateway and connects to the broker with a subscriber client identifier. The broker determines a corresponding subscriber CVM that is authorized for the subscriber client and instructs the CVM to connect to the gateway. The gateway handles the RDP traffic between the subscriber client and the subscriber CVM over a web socket relay which may be referred to as Reverse Connect.

Figure 6:
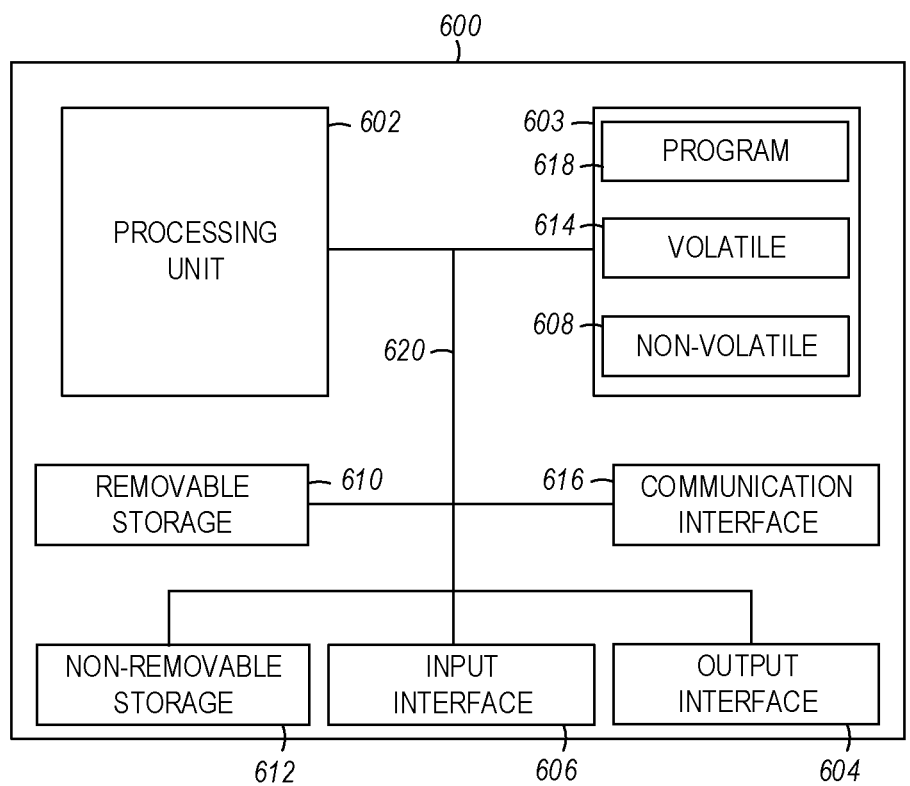
FIG. 6 is a block schematic diagram of a computer system to implement one or more example embodiments.

FIG. 6 is a block schematic diagram of a computer system 600 for use as devices and cloud computing resources for the delivery of services and provisioning and joining of client virtual computers. System 600 also may be used to perform methods and algorithms according to described examples. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method includes granting a subscriber client access to a cloud service-based resource group within a subscriber controlled computing environment, the subscriber controlled computing environment having a virtual network, establishing, via the virtual network, a direct network connection to a domain controller in the subscriber controlled computing environment, extending the virtual network to a subscriber client virtual machine in a producer cloud service, joining the subscriber client virtual machine with the virtual network, and providing access, by the subscriber client via the subscriber controlled computing environment and virtual network, to the subscriber client virtual machine. Subscribers may simply identify a number of subscriber clients and specified virtual machines in order to cause the subscriber client virtual machines to be provisioned and linked such as by joining to the virtual network for use by the corresponding subscriber clients, saving significant effort in allocating and managing the provisioning of virtual machines.

2. The method of claim 1 wherein access to the subscriber client virtual machine is provided to the subscriber client via a dedicated network connection in the cloud service-based resource group.

3. The method of claim 2 wherein the dedicated network connection comprises a network interface card accessed via a subscriber client token.

4. The method of any of claims 1-3 wherein extending the virtual network to the subscriber client virtual machine includes confirming, by a test virtual machine, that the virtual network can support the subscriber client virtual machine and responsive to the test virtual machine confirming that the virtual network can support the subscriber client virtual machine, provisioning the subscriber client virtual machine.

5. The method of claim 4 wherein confirming that the virtual network can support the subscriber client virtual machine includes performing, by the test virtual machine, a domain join with the domain controller using a producer cloud service token.

6. The method of any of claims 4-5 wherein controlling the test virtual machine comprises checking that connections to the virtual network are available.

7. The method of any of claims 4-6 wherein controlling the test virtual machine comprises determining that a directory service join is available via the domain controller.

8. The method of any of claims 1-7 and further including sending a request to the producer cloud service for virtual machines, sending a request for a first token to a director service joined with the domain controller, and generating the client virtual machine as a function of the first token.

9. The method of any of claims 1-8 wherein accessing the cloud service-based resource group includes using, via a subscriber client device, a subscription token to access the subscriber controlled virtual environment.

10. The method of claim 9 wherein extending the virtual network to the subscriber client virtual machine in the producer cloud service to provide access to the subscriber client virtual machine includes receiving a virtual network linking token.

11. The method of any of claims 1-10 and further includes providing multiple subscriber clients access to multiple respective subscriber client virtual machines via multiple respective unique network interface connections to the virtual network.

12. The method of claim 11 and further including managing each of the subscriber client virtual machines via the producer cloud service in accordance with a provisioning policy provided via the subscriber controlled computing environment.

13. A machine-readable storage device has instructions for execution by a processor of a machine to cause the processor to perform operations to perform a method. The operations include granting a subscriber client access to a cloud service-based resource group within a subscriber controlled computing environment, the subscriber controlled computing environment having a virtual network, establishing, via the virtual network, a direct network connection to a domain controller in the subscriber controlled computing environment, extending the virtual network to a subscriber client virtual machine in a producer cloud service, joining the subscriber client virtual machine with the virtual network, and providing access, by the subscriber client via the subscriber controlled computing environment and virtual network, to the subscriber client virtual machine.

14. The device of claim 13 wherein access to the subscriber client virtual machine is provided to the subscriber client via a dedicated network connection in the cloud service-based resource group and wherein the dedicated network connection includes a network interface card accessed via a subscriber client token.

15. The device of any of claims 13-14 wherein extending the virtual network to the subscriber client virtual machine includes confirming, by a test virtual machine, that the virtual network can support the subscriber client virtual machine and responsive to the test virtual machine confirming that the virtual network can support the subscriber client virtual machine, provisioning the subscriber client virtual machine.

16. The device of claim 15 wherein confirming that the virtual network can support the subscriber client virtual machine includes performing, by the test virtual machine, a domain join with the domain controller using a producer cloud service token.

17. The device of any of claims 15-16 wherein controlling the test virtual machine includes checking that connections to the virtual network are available and that a directory service join is available via the domain controller.

18. The device of any of claims 13-17 wherein the operations further include sending a request to the producer cloud service for virtual machines, sending a request for a first token to a director service joined with the domain controller, and generating the client virtual machine as a function of the first token.

19. The device of any of claims 13-18 wherein accessing the cloud service-based resource group includes using, via a subscriber client device, a subscription token to access the subscriber controlled virtual environment and wherein extending the virtual network to the subscriber client virtual machine in the producer cloud service to provide access to the subscriber client virtual machine includes receiving a virtual network linking token.

20. A device includes a processor and a memory device coupled to the processor and having a program stored thereon for execution by the processor to perform operations. The operations include granting a subscriber client access to a cloud service-based resource group within a subscriber controlled computing environment, the subscriber controlled computing environment having a virtual network, establishing, via the virtual network, a direct network connection to a domain controller in the subscriber controlled computing environment, extending the virtual network to a subscriber client virtual machine in a producer cloud service, joining the subscriber client virtual machine with the virtual network, and providing access, by the subscriber client via the subscriber controlled computing environment and virtual network, to the subscriber client virtual machine.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
    granting a subscriber client access to a cloud service-based resource group within a subscriber controlled computing environment, the subscriber controlled computing environment having a virtual network;
    establishing, via the virtual network, a direct network connection to a domain controller in the subscriber controlled computing environment;
    extending the virtual network to a subscriber client virtual machine in a producer cloud service;
    joining the subscriber client virtual machine with the virtual network; and
    providing access, by the subscriber client via the subscriber controlled computing environment and virtual network, to the subscriber client virtual machine.

2. The method of claim 1 wherein access to the subscriber client virtual machine is provided to the subscriber client via a dedicated network connection in the cloud service-based resource group.

3. The method of claim 2 wherein the dedicated network connection comprises a network interface card accessed via a subscriber client token.

4. The method of claim 1 wherein extending the virtual network to the subscriber client virtual machine comprises:
    confirming, by a test virtual machine, that the virtual network can support the subscriber client virtual machine; and
    responsive to the test virtual machine confirming that the virtual network can support the subscriber client virtual machine, provisioning the subscriber client virtual machine.

5. The method of claim 4 wherein confirming that the virtual network can support the subscriber client virtual machine includes performing, by the test virtual machine, a domain join with the domain controller using a producer cloud service token.

6. The method of claim 4 wherein controlling the test virtual machine comprises checking that connections to the virtual network are available.

7. The method of claim 4 wherein controlling the test virtual machine comprises determining that a directory service join is available via the domain controller.

8. The method of claim 1 and further comprising:
    sending a request to the producer cloud service for virtual machines;
    sending a request for a first token to a director service joined with the domain controller;
    generating the client virtual machine as a function of the first token.

9. The method of claim 1 wherein accessing the cloud service-based resource group comprises using, via a subscriber client device, a subscription token to access the subscriber controlled virtual environment.

10. The method of claim 9 wherein extending the virtual network to the subscriber client virtual machine in the producer cloud service to provide access to the subscriber client virtual machine comprises receiving a virtual network linking token.

11. The method of claim 1 and further comprising providing multiple subscriber clients access to multiple respective subscriber client virtual machines via multiple respective unique network interface connections to the virtual network.

12. The method of claim 11 and further comprising managing each of the subscriber client virtual machines via the producer cloud service in accordance with a provisioning policy provided via the subscriber controlled computing environment.

13. A machine-readable storage device having instructions for execution by a processor of a machine to cause the processor to perform operations to perform a method, the operations comprising:
  granting a subscriber client access to a cloud service-based resource group within a subscriber controlled computing environment, the subscriber controlled computing environment having a virtual network;
  establishing, via the virtual network, a direct network connection to a domain controller in the subscriber controlled computing environment;
  extending the virtual network to a subscriber client virtual machine in a producer cloud service;
  joining the subscriber client virtual machine with the virtual network; and
  providing access, by the subscriber client via the subscriber controlled computing environment and virtual network, to the subscriber client virtual machine.

14. The device of claim 13 wherein access to the subscriber client virtual machine is provided to the subscriber client via a dedicated network connection in the cloud service-based resource group and wherein the dedicated network connection comprises a network interface card accessed via a subscriber client token.

15. The device of claim 13 wherein extending the virtual network to the subscriber client virtual machine comprises:
  confirming, by a test virtual machine, that the virtual network can support the subscriber client virtual machine; and
  responsive to the test virtual machine confirming that the virtual network can support the subscriber client virtual machine, provisioning the subscriber client virtual machine.

16. The device of claim 15 wherein confirming that the virtual network can support the subscriber client virtual machine includes performing, by the test virtual machine, a domain join with the domain controller using a producer cloud service token.

17. The device of claim 16 wherein controlling the test virtual machine comprises checking that connections to the virtual network are available and that a directory service join is available via the domain controller.

18. The device of claim 13 wherein the operations further comprise:
  sending a request to the producer cloud service for virtual machines;
  sending a request for a first token to a director service joined with the domain controller;
  generating the client virtual machine as a function of the first token.

19. The device of claim 13 wherein accessing the cloud service-based resource group comprises using, via a subscriber client device, a subscription token to access the subscriber controlled virtual environment and wherein extending the virtual network to the subscriber client virtual machine in the producer cloud service to provide access to the subscriber client virtual machine comprises receiving a virtual network linking token.

20. A device comprising:
  a processor; and
  a memory device coupled to the processor and having a program stored thereon for execution by the processor to perform operations comprising:
  granting a subscriber client access to a cloud service-based resource group within a subscriber controlled computing environment, the subscriber controlled computing environment having a virtual network;
  establishing, via the virtual network, a direct network connection to a domain controller in the subscriber controlled computing environment;
  extending the virtual network to a subscriber client virtual machine in a producer cloud service;
  joining the subscriber client virtual machine with the virtual network; and
  providing access, by the subscriber client via the subscriber controlled computing environment and virtual network, to the subscriber client virtual machine.

* * * * *